April 20, 1965 R. R. GIBSON ETAL 3,179,117
TRAILER MOUNTED CLEANER
Filed March 2, 1964 4 Sheets-Sheet 1
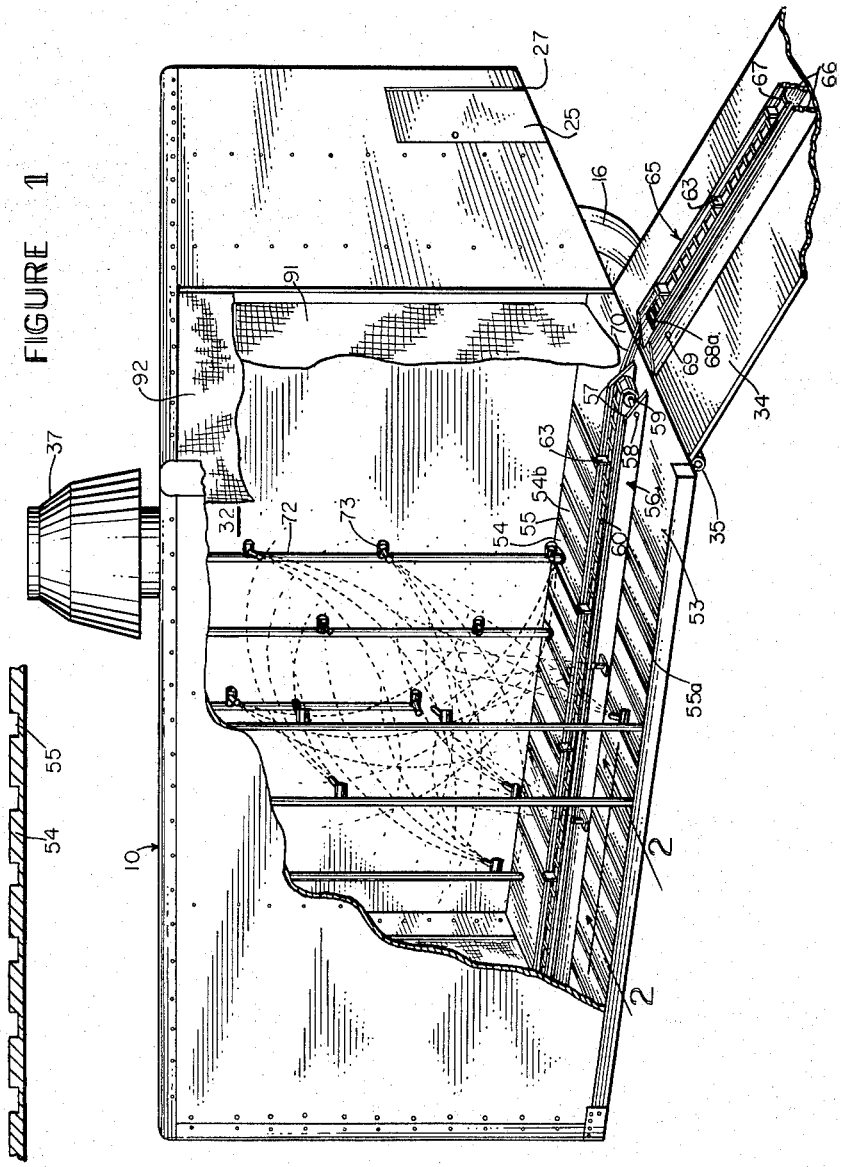
R. Robert Gibson and Charles M Rohda, INVENTORS
BY
ATTORNEY

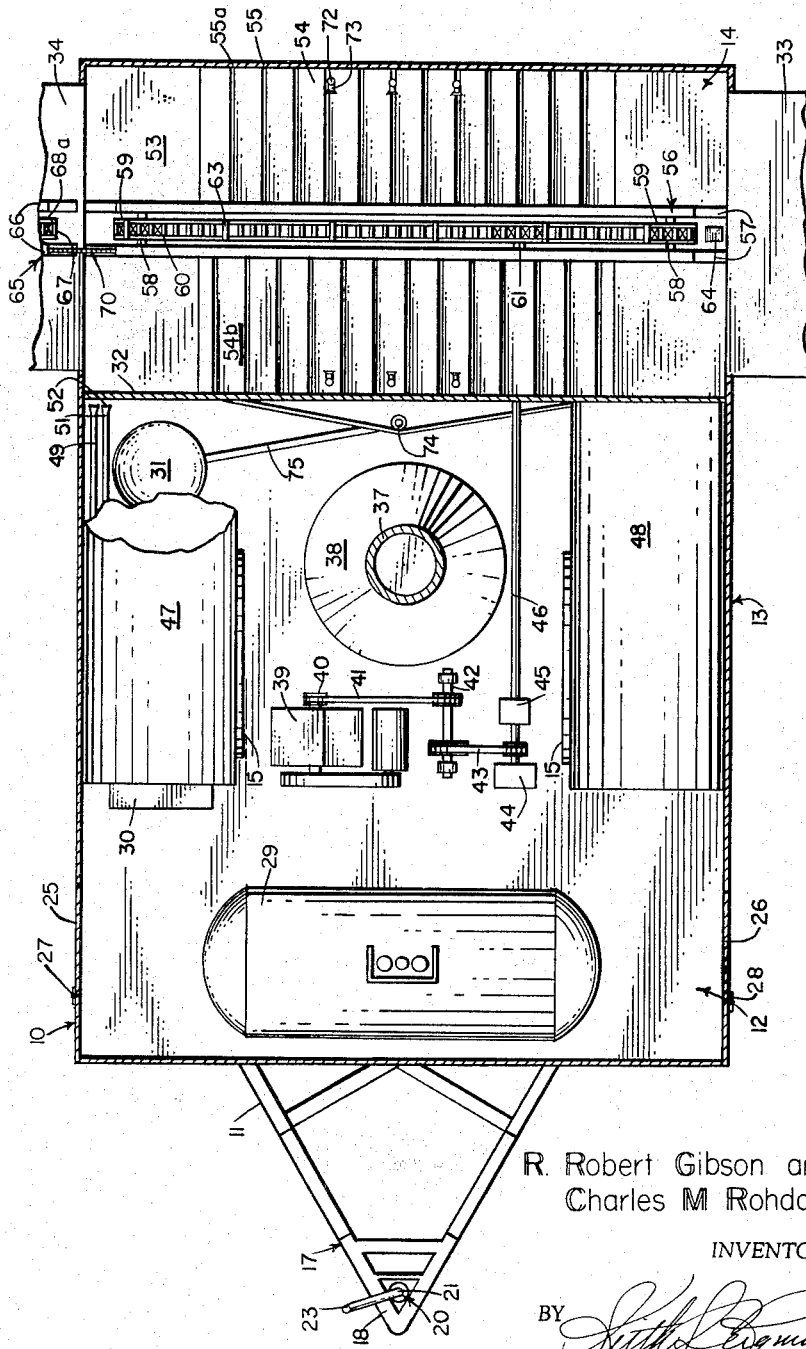

April 20, 1965  R. R. GIBSON ETAL  3,179,117
TRAILER MOUNTED CLEANER
Filed March 2, 1964  4 Sheets-Sheet 3

R. Robert Gibson and
Charles M. Rohda.
INVENTORS
BY
ATTORNEY.

April 20, 1965

R. R. GIBSON ETAL 3,179,117

TRAILER MOUNTED CLEANER

Filed March 2, 1964

R. Robert Gibson and
Charles M. Rohda,
INVENTORS

BY
ATTORNEY

United States Patent Office 3,179,117
Patented Apr. 20, 1965

3,179,117
TRAILER MOUNTED CLEANER
Rolla Robert Gibson and Charles M. Rohda, Spokane, Wash., assignors to Cart Cleaning Corporation of America, Spokane, Wash., a corporation of Washington
Filed Mar. 2, 1964, Ser. No. 348,601
3 Claims. (Cl. 134—107)

This invention relates generally to a mobile mounted cleaning device for grocery carts and similar structures and more particularly to such a device mounted on a trailer body or a pickup truck and adapted to clean ordinary grocery carts of commerce in a short period of time without the necessity of the operator's lifting the carts.

A wire rod or mesh type grocery cart, usually having four pivotably mounted wheels to aid its movement, has become commonplace in the self-service markets of America. Such carts vary somewhat in design and occasionally in size, but all have many features in common: they usually have four pivotably mounted wheels to aid in their movement through a store; they commonly are designed either from wire rod or mesh so as to present a reasonably open surface on any side; they commonly are designed so that several baskets may be nested together in one fashion or another to provide storage in smaller space; and they commonly all collect dirt and debris to a greater or lesser extent.

Filth of any sort is not particularly tolerable by either shopkeepers or their patrons and the intolerability increases markedly in food establishments. Because of the commonly open nature of such establishment, their size, the nature of the produce hauled in carts, and the filth contained upon products which are carried, dirt does commonly accumulate upon the carts to a relatively unobservable state, but often times to a much greater accumulation.

With this background in mind it has become increasingly desirable to provide some simple, inexpensive efficient means of cleaning this filth from such carts, periodically, as the occasion may arise. To this end it is:

A principal object of my invention to provide a mobile mounted, self-contained cleaning device for the open wire rod or wire mesh merchandise cart of commerce.

It is another object to provide a device of the nature aforesaid that will perform its function without the necessity of an operator's lifting the carts to be cleaned.

It is another object of the invention to provide a device of the nature aforesaid that cleans and recycles water used therein to prevent substantial loss thereof.

It is another object of the invention to provide a device of the nature aforesaid that provides heated pressurized water for external use should this be desired.

It is a further object of my invention to provide a cart cleaner of the nature aforesaid that may be moved by a trailer like structure or may be, in one species, mounted upon a pick up truck.

It is a further object of my invention aforesaid to provide a cart cleaner of the side loading variety of new and novel design, of simple and rugged nature, and of economy of manufacture and great durability.

Other and further objects of my invention will appear from the following drawings, specification and claims which form a part of this application and in which like numbers of reference refer to similar parts throughout.

In the following drawings:

FIGURE 1 is a partially cut away perspective view of the trailer-mounted version of my invention showing the cleaning chamber and the arrangement of spray heads therein.

FIGURE 2 is a partial cross sectional view of FIGURE 1 taken on the line 2—2 thereon, in the direction indicated by the arrows, showing the ridge-like nature of the floor of my invention, adapted to jostle carts passing thereover.

FIGURE 3 is a top plan view of my invention showing the divisions of my trailer and the arrangement of the various parts therein.

Figure 4:
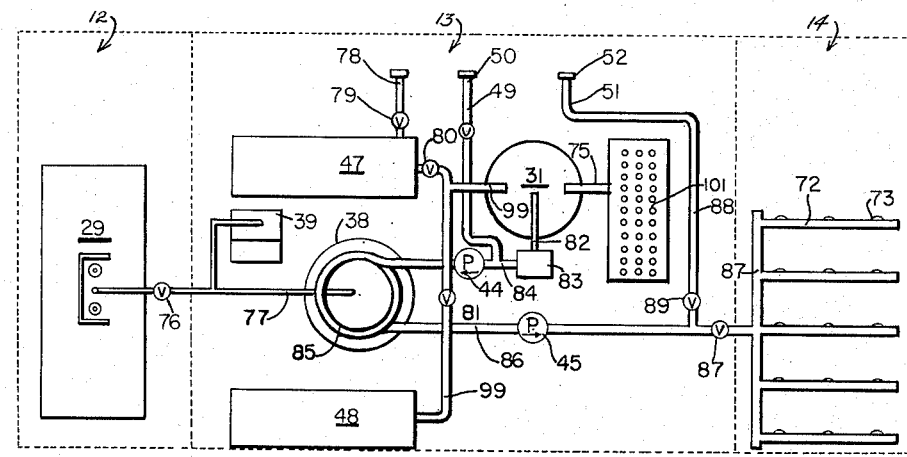
FIGURE 4 is a diagrammatic representation of the water circuitry and gas circuitry of my invention.
Figure 5:
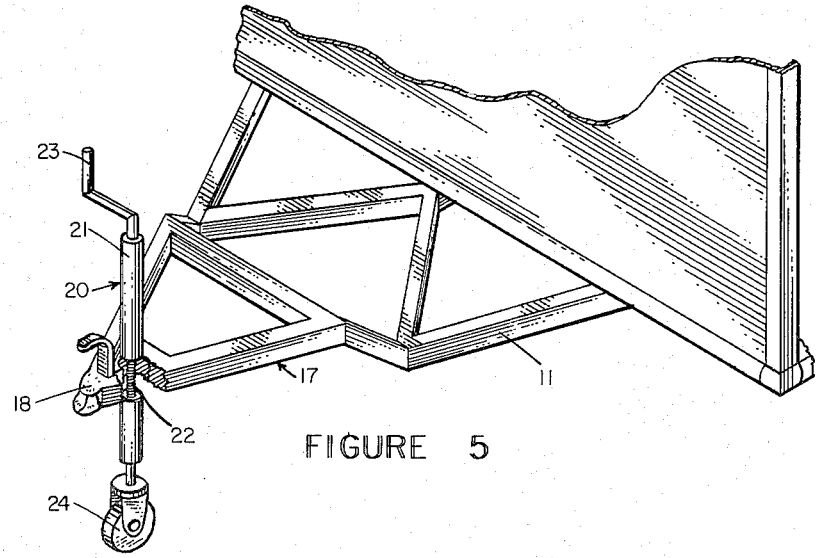
FIGURE 5 is a partial isometric view of the elevating hitch of my invention.

Referring now to the drawings in greater detail and particularly to those of FIGURES 1 and 3, it will be seen that my invention comprises essentially a box-like rectangular body 10 carried by an under-frame 11 providing means for mobility by way of the two rearward paired opposed wheels 100. The body 10 is divided into three chambers, a forward chamber 12 carrying the gas fuel supply and other necessary supplies together with the controls, a central chamber 13 carrying the heating unit, pump motors, sump and various other working parts, and a rearward washing chamber 14 where the cart cleaning is actually accomplished.

The trailer frame 11 illustrated in FIGURE 3 is an ordinary trailer frame of the type wel known in the trailer arts, constructed of rectangular I-beams with principal beam members extending in a lengthwise direction. Since the floor of the central chamber 13 must be somewhat lower to accommodate water drainage thereto, appropriate provision must be made in the underlying frame 11 for this. To provide a lower relative position of the trailer floor to the earth, wheel wells 15 for the opposed paired wheels 16 may be allowed to project upwardly through the trailer floor as illustrated.

The trailer hitch 17 is of the ordinary triangular variety known in the art with its apex 18 projecting forwardly and its rearwardly extending legs 19 communicating with the principal longitudinal members of the frame 11. The forward wheel leveling assembly 20 is provided in the apex 18 of the hitch 17. This assembly 20 comprises the outer shaft 21 rigidly affixed to the apex 18 of the trailer hitch 17, in turn threadedly carrying within it the internal shaft 22 having the crank handle 23 non-rotatably attached in its upper portion and the forward pivotably mounted castor-like wheel 24 rotatably attached at its lower extension. With this assembly and with the forward wheel 24 resting on the earth, the relative position of the hitch 17 in regard to the earth may be changed, within limits, by screwing the internal shaft 22 upwardly or downwardly in the outer shaft 21 as conditions may require to level the trailer floor.

The rectangular box-like body 10 of my invention is constructed from sheet aluminum, upon an aluminum frame-work resting upon the under frame 11, by means well known in the trailer arts. Side doors 25, 26 are provided opening into the forward chamber 12. These are hingeably mounted preferably by the piano type hinges 27, 28 vertically oriented as illustrated. These doors give access to the gas supply tank 29 and the control panel 30 as well as to the forwardly extending parts of the central chamber 13.

The central chamber 13 should have its floor at a level lower than that of the lowest point on the floor of the washing chamber 14 to provide for drainage of water into the sump 31, or else if desired, the sump 31 may be allowed to project downwardly through and below the floor of the central chamber 13.

The rearward washing chamber 14 is enclosed on its forward side by the wall 32 to prevent the entry of water into the central chamber 13. Two downwardly opening ramp-doors 33, 34 are provided in the sides of the washing chamber 14 to provide ingress and egress thereto and therefrom. These doors 33, 34 are pivoted about the horizontal hinges 35, preferably of the piano type, and are provided with appropriate latches to keep them closed when desired. The doors 33, 34 are designed and adapted to be used as a ramp to allow carts to be rolled on their wheels into the washing chamber 14 and therefrom as required.

An appropriately sized and positioned vent stack 37 is provided in the roof of the body 10 above the central chamber 13 to vent the combustion products of the water heater. The necessary trailer accessories required by various vehicular authorities must, of course, be provided on the exterior surface of the trailer body if it is to be used upon public roadways.

The forward trailer chamber 12 carries the compressed gas tank 29 and the control panel 30 adjacent the right door 25 for easy access. With normal sizing of the various structures there will be sufficient room left within this chamber for storage of any other desired materials or tools.

The central chamber 13 carries in an internal central location the gas-fired water heater 38 communicating through the roof of the body 10 to the vent stack 37. Immediately forward of the heater 38 in the central chamber 13 is the gas operated motor 39 communicating from its power take off 40 through the belt 41 to the speed reducing transmission 42. Power is taken from the speed reducing transmission 42 by the belt 43 to operate the two pumps 44, 45 sharing the common axle 46. Water storage and supply tanks 47, 48 are provided in the upper side portions on each side of the central chamber 13 and these are filled by means of the input pipe 49 communicating therewith and carrying the ordinary female plumbing fixture adapted to mate with a garden hose fixture of ordinary commerce. An output pipe 51 for heated pressurized water is provided, again with a male fixture 52 adapted to mate with the ordinary fixture of a garden hose of commerce, to provide heated pressurized water for washing of things which cannot or are not desired to be passed through the washing chamber 14. The sump 31 is a vessel, adapted to contain a substantial amount of water, positioned with its uppermost portion at the level of or below the floor drain of the washing chamber 14, so that water may flow therefrom into the sump 31 under action of gravity.

The floor 53 of the rearward washing chamber 14 must of necessity be watertight to provide for return of water into the circulatory system without substantial loss. The floor 53 is constructed with alternating ridges 54 and grooves 55 to provide a jostling effect on nested carts as they pass thereover through the washing chamber 14, so that all parts may be washed. To best accomplish the purpose I prefer to form the groove 55a on one side of the primary tram 56 opposite the ridge 54b on the other side of the tram 56 to improve the jostling action as the carts pass thereover.

The primary cart tram 56 extends along the central portion of the floor 53 between the central portions of the doors 33, 34 and perpendicular to the longer dimension of the trailer body 10. This primary cart tram 56 consists of the low side walls 57 on each side forming a trough therebetween. Stud shafts 58 are rotatably journaled near each end in the side walls 57 and carry irrotatably the sprockets 59 adapted to enmesh with the endless link chain 60 to form a continuous driving circuit. The link chain 60 is driven by the driving sprocket 61 irrotatably carried upon the shaft 46, which in turn is driven by the motor 39. The link chain 60 carries the upwardly projecting lugs 63 adapted to just engage the bottom portion of grocery carts, preferably at an axle, and carry them along the cart tram 56.

At the forward end of the floor 53 there is a slightly raising ramp 64 designed to raise the wheels of a cart being moved by the tram 56 sufficiently so that the upwardly projecting engaging lug 63 of the tram chain 60 will come out of engagement with the bottom of the cart and thus allow it to be freely removed from the exit ramp 34, usually by force of gravity.

A secondary tram 65 comprising the similar raised side walls 66 forming a channel for the link chain 67 is positioned along the central portion of the entrance ramp 64, extending therealong from the primary tram 56 so as to communicate therewith. This link chain 67 is again carried by sprockets 68 engaged therewith journaled on stud shafts near the end portions of the side walls 66. The innermost sprocket 68a has its shaft extend into a pocket in the side wall 66 and carries thereon the nonrotatably mounted pinion 69 driven by the chain 70 from the similar pinions 71 on the shaft 62a of the primary tram 56. Thusly, with this arrangement, when the primary tram chain 60 is driven it will in turn drive the secondary tram chain 67. This chain 67 carries upwardly projecting lugs 63 so it also will aid in moving carts engaged thereon up the ramp and onto the primary tram 56.

The ends of the side rails 66, 57 at their meeting point must of necessity be mortised approximately 45 degrees or more so that the ramp-door 33 may be affixed in its closed position; when this occurs, slack will result in the chain 70, but if the chain is not too long it will remain engaged upon the two pinions 69, 71 and will be in place when the ramp 33 is again lowered for use.

Water distribution pipes 72 are arranged in five circuits about the inner periphery of the washing chamber 14, and are provided with a plurality of sprinkler heads 73 through which a fine spray of water is forced. These heads 73 are distributed in three staggered rings as illustrated and each head is angled appropriately to cause a vortex-like spray of water in the washing chamber 14 with the vortex center horizontal and essentially at the center of the chamber and the water swirling thereabout in a torus-like figure with its plane substantially vertical to effect the greatest washing action from the water. The floor 53 of the washing chamber 14 is sloped to the point 74 which is the lowest point thereon and communicates therefrom by the pipe 75 to the lower sump 31 by action of gravity.

The circulation of gas and water in my invention is best illustrated in the diagram of FIGURE 4. In the preferred form of my invention I use liquified propane gas as fuel. This gas is contained under pressure in the storage tank 29 and passes therefrom through the regulatory valve 76 into the pipe 77 from whence it is distributed to the propane motor 39 and the water heating unit 38, where it is consumed.

Water for use in the cart washer is stored in the two tanks 47 and may be introduced therein through the input pipe 78 controlled by the input valve 79. Water flow from the tank on one side is controlled by the valve 80 and on the other side by the valve 81 to provide an individually regulated flow of water from the storage tanks 47. The storage tanks 47 are arranged at a fairly high position in the trailer, and flow of water therefrom through the pipe 99 to the sump 31 is caused by gravity. Water passes from the sump 31 through the pipe 82, which exits above the bottom of the sump so that larger debris may settle and accumulate therein, to the filter 83 by reason of suction caused by the pump 44 in the line 84. The water is thence propelled through this pump 44 into the heating coils 85 of the water heater 38, and passes through these heating coils 85 and thence into the line 86 and to the pump 45 where it is further pressurized. The water then may continue in the line 86 to the distributing pipe 87 which distributes the flow of water substantially equally to the distribution pipes 72 and thence to the spray heads 73. The valve 87 is interposed in this line 86 to regulate the flow therein.

A second line 88 exists from the line 86 between the pump 45 and the valve 87 and it is again controlled as to flow by the valve 89. This line 88 communicates to the output pipe 51 and its attendant fitting 52. If this external output system be used, the water disbursed thereby is obviously lost and cannot generally be recycled through the machine, so in this event it is desirable or necessary to have a secondary input. The secondary input pipe 49 with its attendant fixture 50 passes through the input line 90 and communicates with the line 84 between the filter 83 and the pump 44 to provide an increased supply of water aside from that contained in the storage tanks 47, should this be necessary.

The water in normal operation sprayed from the heads 73 is collected in the drain 101 on the floor 53 and thence communicates by the pipe 75 back to the sump 31 to recycle. It is thus seen from the circuitry described that water normally sprayed by the heads 73 within the washing chamber 14 will be collected and recycled back through the system without any substantial loss from the water that is ultimately collected by the drain 101.

Canvas-like fabric or plastic drapes 91 are provided along the sides of the washing chamber 14 at both its forward and rearward portions and a downwardly extending drape 92 of similar nature is provided extending downwardly from the roof of the washing chamber 14 to partially enclose the lateral openings thereof to prevent an excessive loss of water therefrom in the form of spray or fine particles when in use.

In operation, my invention is activated by starting the gas motor 39 and the water heater 38. The valve 80 is opened to allow water contained in the storage tanks 47 to pass into the sump 31 at a predetermined appropriate rate of flow and this water is forced by the pump 44 into the water heater 38 thence through the line 86 and into the distribution pipe 72 and spray heads 73 from whence it is sprayed into the washing chamber 14. A group of nestled carts to be cleaned are rolled upon their wheels to the loading ramp 33 and the bottom portion thereof are engaged with the lugs 63 on the chain 70. This causes the carts coming into engagement with the lugs 63 to progress along the tram on the raising ramp and thence to the primary tram 56 on the washing chamber floor 53. The carts are then jostled through the washing chamber 14 and emerge at the opposite end, become disengaged from the lug 63 and pass on down the exit ramp 34, having been cleaned in their transit through the chamber 14.

Obviously, speeds, pressures and temperatures relating to my invention can be widely varied and remain within its scope and purpose, but I prefer to use water in my device at a temperature of about 140 degrees and a pressure of about 100 pounds. I prefer to spray approximately 20 gallons of water per minute from the combines spray heads 73 and prefer to have the carts remain within the spray chamber between the forward and rearward pairs of drapes 91, 92 approximately 3 or 4 minutes. By reason of this pressure, temperature and volume of water and in combination with the jostling of the various carts I have found these conditions sufficient to clean most carts. Because of the temperature of the water used and the quantity of heat transmitted to the carts in their passage through the cleaning chamber, I have not found it necessary to provide a drying chamber for the carts but rather prefer to allow them to dry normally in the air or in the store, depending upon weather conditions, after their exit from the cleaning machine. Detergents or other cleaning agents obviously can be added to the washing water as desired.

Figure 6:
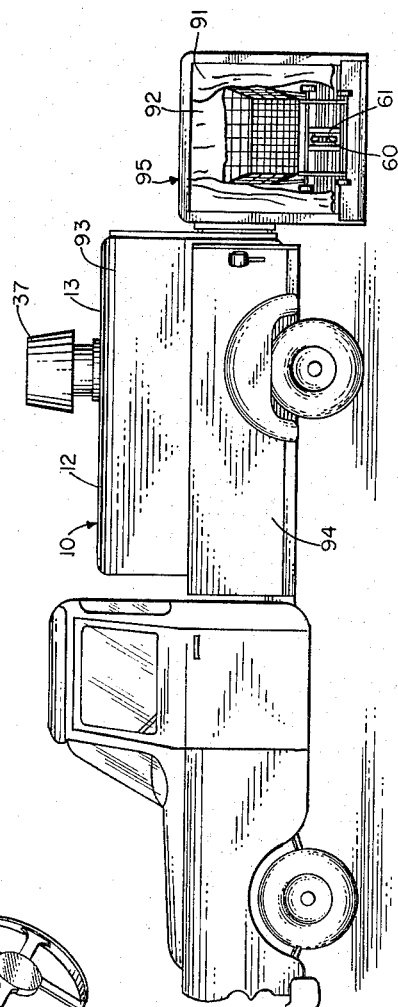
FIGURE 6 is a pick-up mounted version of a species of my invention having the cleaning chamber moveable in a vertical plane.
Figure 7:
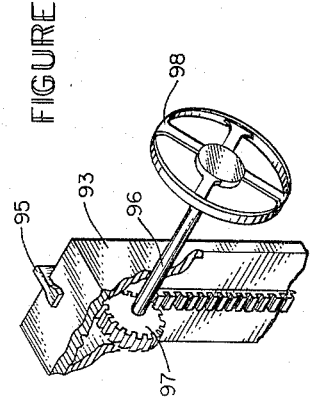
FIGURE 7 is a partial isometric view of the rack and pinion device that raises and lowers the cleaning chamber of the pick-up mounted species of my invention.

Another version of my invention is illustrated in FIGURE 6. In this form of my invention the forward 12 and middle 13 chambers are carried in the stationary body 93, rigidly mounted in the normal bed of a pick up truck 94. The rearward washing chamber 14 is constructed as a separate unit 95 as illustrated. Its internal structure is the same as that described except, of course, the wall between it and the middle chamber 13 is doubled and the various communicating pipes must be flexible or have flexible joints of types well known in the art. Power must be supplied to the driving sprockets 61 of the link chain 60 through a flexible shaft or separate gas propelled motor (not shown).

In this version of my invention the pinion 96 is rigidly carried by the stationary portion of the body 93 and an appropriate dovetail type bracket fits over the ratchet 97 of the moveable back unit 95 to give additional structural rigidity. The mating ratchet 97 enmeshes with the pinion 96 so that when the pinion 96 be turned by means of the wheel 98, the moveable back unit 95 may be raised or lowered at will.

The function and operation of this species of my invention is exactly the same as the trailer mounted version though oftentimes it may be more desirable to mount the invention on a pick up, as illustrated in this species, so that it is then a self powered unit.

The foregoing description of my invention is necessarily of a detailed and particular nature so that a specific embodiment of it may be set forth as required, but this should not be construed as to prevent various modifications of detail and multiplication and rearrangement of parts which are included within the spirit, essence and scope of my invention as set forth.

Having thus described my invention, what I claim is:
1. In a trailer mounted cart cleaning device of the nature aforesaid, the combination, comprising, a rectangular trailer frame having rearward paired opposed wheels to aid locomotion and a forward centrally located pivotably mounted leveling wheel, carried by a forwardly projecting hitch, adapted to raise or lower such hitch to level the trailer frame; a rectangular box-like trailer body mounted upon said frame comprising a forward chamber having doors mounted on each side thereof for access, a central chamber carrying working mechanism and a rearward enclosed washing chamber having downwardly opening doors on each side thereof, pivotably supported by horizontal hinges at their lowermost portion to allow said doors to be lowered to form ramps for ingress and egress of carts to and from said chamber; a primary tram transversely carried by the central portion of the floor of said washing chamber, communicating with a secondary parallel tram carried by the ingress ramp, adapted to move carts to be cleaned up said ingress ramp and through said washing chamber; inwardly projecting flaps about the inner periphery of the entrance and exit to said washing chamber adapted to prevent the excessive spray of water therefrom; a floor in said washing chamber having alternate grooves and ridges on each side of said central tram adapted to jostle nested carts passing therethrough a recirculating water system comprising two elevated storage tanks, having means of providing water thereto, communicating through a manually adjustable valve to a sump, disposed below the floor of said washing chamber so that water may flow by gravity from said chamber thereto, a filter communicating with said sump and a pump communicating with said filter adapted to take water from said sump, through said filter and force it into the heating coils of a water heating device, a second pump communicating with said heating coils adapted to further pressurize said water and distribute it to a plurality of spray circuits, each containing a plurality of spray heads disposed in three rings about the central internal periphery of aforesaid washing chamber, each of said spray nozzles being so adjusted as to create a vortex-like distribution of water within said chamber; and means of providing heat to said heating unit and power to said pumping units and said tram.

2. The invention of claim 1 having a valve controlled input circuit for water between said filter and said first pump and a valve controlled external outlet circuit communicating between said second pump and the control valve regulating flow to said washing head circuits.

3. The invention of claim 1 wherein the forward and middle chambers are mounted upon the bed of a pick up truck, and the rearward washing chamber is adjustably vertically moveable in relation thereto so that it may be raised for movement and lowered substantially to ground level for operation.

References Cited by the Examiner

UNITED STATES PATENTS

| | | | |
|---|---|---|---|
| 2,677,368 | 5/54 | Janecek | 134—107 X |
| 2,981,266 | 4/61 | Tamburri | 134—123 X |
| 2,997,048 | 8/61 | Gertken | 134—72 |

CHARLES A. WILLMUTH, *Primary Examiner.*